(12) United States Patent
Hirata et al.

(10) Patent No.: US 11,515,545 B2
(45) Date of Patent: Nov. 29, 2022

(54) AIR ELECTRODE MATERIAL POWDER FOR SOLID OXIDE FUEL CELLS

(71) Applicant: SAKAI CHEMICAL INDUSTRY CO., LTD., Osaka (JP)

(72) Inventors: Norimune Hirata, Osaka (JP); Minoru Yoneda, Osaka (JP)

(73) Assignee: SAKAI CHEMICAL INDUSTRY CO., LTD., Osaka (JP)

(*) Notice: Subject to any disclaimer, the term of this patent is extended or adjusted under 35 U.S.C. 154(b) by 173 days.

(21) Appl. No.: 16/977,939

(22) PCT Filed: Mar. 14, 2019

(86) PCT No.: PCT/JP2019/010569
§ 371 (c)(1),
(2) Date: Sep. 3, 2020

(87) PCT Pub. No.: WO2019/188349
PCT Pub. Date: Oct. 3, 2019

(65) Prior Publication Data
US 2020/0411883 A1   Dec. 31, 2020

(30) Foreign Application Priority Data
Mar. 29, 2018   (JP) .............................. JP2018-064172

(51) Int. Cl.
*H01M 4/90*   (2006.01)
*H01M 4/86*   (2006.01)
*H01M 8/1213*   (2016.01)
(Continued)

(52) U.S. Cl.
CPC ........ *H01M 4/9033* (2013.01); *H01M 4/8621* (2013.01); *H01M 8/1213* (2013.01);
(Continued)

(58) Field of Classification Search
CPC ............ H01M 4/9033; H01M 4/8621; H01M 8/1213; H01M 2008/1293; C04B 35/00; C04B 35/488; C04B 35/2608
See application file for complete search history.

(56) References Cited

U.S. PATENT DOCUMENTS

| | | | | |
|---|---|---|---|---|
| 5,145,753 A * | 9/1992 | Irino | ................... | H01M 8/2432 429/479 |
| 2010/0112407 A1 * | 5/2010 | Hansen | ............... | H01M 4/8652 252/182.1 |

(Continued)

FOREIGN PATENT DOCUMENTS

| | | |
|---|---|---|
| JP | 2007-27036 | 2/2007 |
| JP | 2009-35447 | 2/2009 |

(Continued)

OTHER PUBLICATIONS

International Search Report (ISR) dated Jun. 18, 2019 in corresponding International (PCT) Application No. PCT/JP2019/010569.

*Primary Examiner* — Jeremiah R Smith
(74) *Attorney, Agent, or Firm* — Wenderoth, Lind & Ponack, L.L.P.

(57) ABSTRACT

The invention provides an air electrode material powder for solid oxide fuel cells, comprising particles of a perovskite composite oxide represented by the general formula ABO3, and comprising La and Sr as the A-site elements, and Co and Fe as the B-site elements.

12 Claims, 1 Drawing Sheet

(51) Int. Cl.
*H01M 8/12* (2016.01)
*C04B 35/00* (2006.01)
*C04B 35/26* (2006.01)
*C04B 35/488* (2006.01)

(52) U.S. Cl.
CPC .......... *C04B 35/00* (2013.01); *C04B 35/2608* (2013.01); *C04B 35/488* (2013.01); *H01M 2008/1293* (2013.01)

(56) References Cited

U.S. PATENT DOCUMENTS

| | | | | |
|---|---|---|---|---|
| 2013/0295484 | A1* | 11/2013 | Seo | H01M 8/1231 252/519.15 |
| 2014/0106259 | A1* | 4/2014 | Kwak | H01M 4/9033 429/523 |
| 2015/0147677 | A1* | 5/2015 | Barnett | H01M 8/1246 264/43 |
| 2016/0093897 | A1* | 3/2016 | Kakinuma | H01M 8/24 429/465 |
| 2018/0131007 | A1 | 5/2018 | Fujisaki et al. | |
| 2019/0088968 | A1* | 3/2019 | Fujisaki | H01M 8/1213 |

FOREIGN PATENT DOCUMENTS

| | | |
|---|---|---|
| JP | 2013-4455 | 1/2013 |
| JP | 2014-182882 | 9/2014 |
| JP | 2016-72037 | 5/2016 |
| JP | 2017-22105 | 1/2017 |

\* cited by examiner

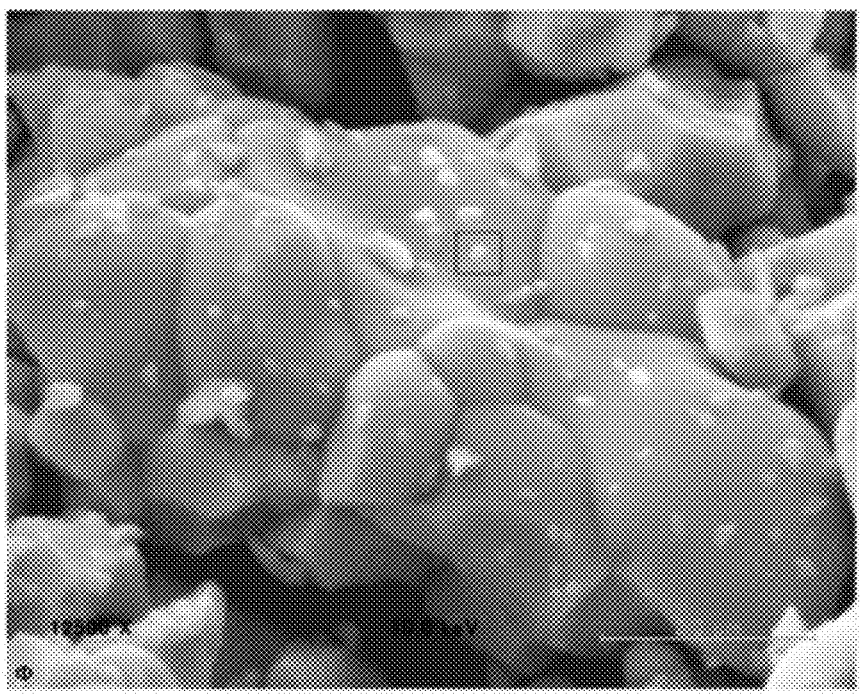

AIR ELECTRODE MATERIAL POWDER FOR SOLID OXIDE FUEL CELLS

TECHNICAL FIELD

The present invention relates to a material powder for forming an air electrode for solid oxide fuel cells. Hereinafter, the material powder for forming an air elect rode of solid oxide fuel colls may be simply referred to as the air electrode material powder. In the invention, the air electrode material powder includes not only a material powder for forming the air electrode of solid oxice fuel cells, but also a material powder for forming a current collector of solid oxide fuel cells. Therefore, the air electrode material powder according to the invention can be suitably used not only for forming an air electrode of solid oxide fuel cells but also for forming a current collector of solid oxide fuel cells.

More specifically, the invention relates to an air electrode material powder for solid oxide fuel cells. When the air electrode material powder is made into a paste, applied to a solid oxide electrolyte, and sintered to form an air electrode of solid oxide fuel cells, cracks are hardly generated in the air electrode thus formed. The invention also relates to an air electrode material powder which can be suitably used for forming a current collector of solid oxide fuel cell.

BACKGROUND

In recent years, fuel cells have been attracting attention as a clean energy source. Among them, a solid oxide fuel cell (hereinafter sometimes referred to as SOFC) using as an electrolyte a solid oxide having ion conductivity works at high temperatures in the range of about 800° C. to 1000° C. and has a high power generation efficiency. Hydrocarbon-based fuel or carbon monoxide gas can be utilized as a fuel. In addition, the solid oxide fuel cell has an advantage that the high temperature exhaust heat generated therefrom can be made use of. Thus, it is expected to have a wide range of applications from household use to large-scale power generation. Some have already been put to practical use.

As is well known, the SOFC includes a unit cell as a basic structure in which a solid oxide electrolyte layer is arranged between an air electrode (cathode) to which air is supplied and a fuel electrode (anode) to which fuel (usually hydrogen) is supplied. If necessary, the SOFC has a reaction preventive layer (also called an intermediate layer or a barrier layer) between the air electrode and the electrolyte layer for preventing a reaction between them.

A plurality of the unit cells are electrically connected in series with a conductive joining member such as an interconnector or a current collector to form fuel cell stacks having a required electromotive force. The interconnector functions also as a partition wall that separates the fuel and air from each other. The current collector is provided, for example, between the air electrode and the interconnector in order to reduce current collection loss from the air electrode and to improve the adhesion between the air electrode and the interconnector.

Conventionally, a sintered body of yttria-stabilized zirconia, for example, has been typically used as an electrolyte layer. A perovskite composite oxide having a mixed conductivity, that is, an electron conductivity and an ionic conductivity, and an $ABO_3$ structure, for example, (La, Sr)(Co, Fe)$O_3$, has recently come to be used as an air electrode in order to increase the output of SOFC (see, for example, Patent Document 1).

An air electrode is formed, for example, by making an air electrode material powder into a paste with a resin solution, applying the paste to an electrolyte layer to form a green layer, and sintering the green layer.

However, the air electrode formed by such a method as described above has a problem. That is, when an air electrode material powder made of a perovskite composite oxide is made into a paste, the paste is applied to the surface of electrolyte layer and sintered the powder in a layer on the surface of the electrolyte layer to form an air electrode, cracks are often generated in the air electrode thus formed, or often separated from the electrolyte layer because the perovskite composite oxide and the electrolyte layer are different in the coefficient of thermal expansion, resulting in the reduction of performance of the SOFC obtained.

Therefore, it has been proposed to use two kinds of air electrode material powders which are different in average particle diameters to prevent problems such as generation of cracks or separation of air electrode from occurring even when there is a large difference in the coefficient of thermal expansion between the air electrode and the electrolyte layer. It is said that according to this method, even if there is a large difference in the coefficient of thermal expansion between the air electrode material and the electrolyte material, the shrinkage during sintering of the green layer of the air electrode material is suppressed so that cracks are hardly generated in the air electrode obtained (see Patent Document 2).

It is also known that the output of a fuel cell equipped with an air electrode obtained by sintering a perovskite composite oxide represented by the formula of $La_{0.6}Sr_{0.4}Co_{0.8}O_3$ decreases as the power generation is repeated. It was found that one of the reasons for that was that strontium was enriched on the surface of the air electrode in excess of the stoichiometric ratio as the power generation is repeated. Thus, it has been proposed that when the Sr/La atomic ratio on the surface of the air electrode detected by X-ray photoelectron spectroscopy is R1, and the Sr/La atomic ratio on the exposed surface located 5 nm inside from the surface detected by X-ray photoelectron spectroscopy, the exposed surface being formed by surface treatment of the first surface, is R2, the above-described deterioration of the air electrode, that is, the decrease in output over time is suppressed, and additionally, the generation of cracks on the surface of the air electrode is also suppressed by making the R1/R2 ratio in the range of 1 to 4 (see Patent Document 3).

However, nothing has heretofore been known about the perovskite composite oxide particles for an air electrode before it is sintered, let alone the Sr/La atomic ratio in individual particles.

PRIOR ART

Patent Literature

Patent literature 1: JP 2009-35447 A
Patent literature 2: JP 2016-72037 A
Patent literature 3: JP 2017-22105 A

SUMMARY OF INVENTION

Technical Problem

As described hereinbefore, when an air electrode material powder is made into a paste, the paste is applied to the surface of electrolyte substrate to form a green layer, the green layer is sintered to form an air electrode in a layer on the surface of the electrolyte substrate, cracks are often generated in the thus prepared air electrode. The present inventors have made an intensive study to prevent cracks from generating in the air electrode thus prepared, by using two kinds of air electrode material powders different in average particle diameters as a starting point. As a result, the inventors have found that, when the air electrode material powder contains fine particles in a certain proportion and the strontium segregation is found in the surface layer of the fine particles in a certain proportion or more, cracks are hardly generated in the air electrode prepared using such an air electrode material powder. Thus, the inventors have completed the invention.

Solution to Problem

The invention provides an air electrode material powder for solid oxide fuel cells, comprising particles of a perovskito composite oxide which is represented by the general formula $ABO_3$ and which contains La and Sr as A site elements, and Co and Fe as B-site elements.

wherein the particles comprise coarse particles having a particle diameter of 0.2 μm or more and fine particles having a particle diameter of less than 0.2 μm, wherein the fine particles account for 60% or more of the total number of particles on a number basis, and wherein the Sr/La atomic ratio in the surface layer of 40% or more of the total number of the fine particles on a number basis is three or more times larger than the Sr/La atomic ratio in the surface layer of the coarse particles.

According to the invention, the air electrode material powder preferably comprises the fine particles having a particle diameter of less than 0.2 μm in a proportion of 60% to 80% of the total number of particles on a number basis.

In the air electrode material powder according to the invention, the Sr/La atomic ratio in the surface layer of 40% to 70% of the total number of the fine particles on a number basis is three or more times larger than the Sr/La atomic ratio in the surface layer of the coarse particles.

In the air electrode material powder according to the invention, the Sr/La atomic ratio in the surface layer of 40% to 70% of the total number of the fine particles on a number basis is three to six times larger than the Sr/La atomic ratio in the surface layer of the coarse particles.

The invention provides an air electrode obtained by sintering the air elect rode material powder, that is, an air electrode formed of sintered product of the air electrode material powder.

The invention further provides a current collector by sintering the air electrode material powder, that if, a current collector formed of sintered product of the air electrode material powder.

Advantageous Effects of Invention

When the air electrode material powder according to the invention is, for example, made into a paste, applied to the surface of an electrolyte substrate to form a green layer and then sintered to provide an air electrode, cracks are hardly generated in the air electrode thus prepared.

BRIEF DESCRIPTION OF DRAWINGS

FIG. 1 is a scanning electron micrograph (SEM) of an air electrode material powder according to the invention.

The air electrode material powder for solid oxide fuel cells of the invention comprises particles of a perovskite composite oxide which is represented by the general formula $ABO_3$ and which contains La and Sr as A-site elements, and Co and Fe as B-site elements.

wherein the particles comprise coarse particles having a particle diameter of 0.2 μm or more and fine particles having a particle diameter of less than 0.2 μm, wherein the fine particles account for 60% or more of the total number of particles on a number basis, and wherein the Sr/La atomic ratio in the surface layer of 40% or more of the total number of the fine particles on a number basis is three or more times larger than the Sr/La atomic ratio in the surface layer of the coarse particles.

In the invention, the particle diameter refers to the major axis of particles in an electron micrograph (SEM image), and is measured on the SEM image.

As described above, the air electrode material powder according to the invention comprises the coarse particles and the fine particles, and specifically, the fine particles adhere to the surface of the coarse particles. Therefore, according to the invention, the ratio of the Sr/La atomic ratio in the surface layer of the fine particle to the Sr/La atomic ratio in the surface layer of the coarse particle refers to the ratio of the Sr/La atomic ratio in the surface layer of the fine particle to the Sr/La atomic ratio in the surface layer of the coarse particle to which the fine particle adheres.

The air electrode material powder according to the invention preferably comprises a perovskite composite oxide represented by the general formula $ABO_3$ in which the A-site elements are La and Sr and the B-Site elements are Co and Fe.

According to the invention, the perovskite composite oxide in which the A-site elements are La and Sr and the B-site elements are Co and Fe is preferably represented by the general formula:

$$La_{1-x}Sr_xCo_{1-y}Fe_yO_3 \qquad (1)$$

wherein x and y are numbers satisfying the conditions $0.2 \leq x \leq 0.5$ and $0.1 \leq y \leq 0.9$.

In the above general formula, x and y are such numbers that when they ore within the specified range the perovskite structure for the composite oxide in which the A-site elements are La and Sr and the B-site elements are Co and Fe is stably maintained.

In the perovskite composite oxide having the above composition ratio, the composition ratio of oxygen is stoichiometrically 3. However, according to literature, as the composition ratio of oxygen is represented by 3-δ, it may be partially defected. Here, δ represents the amount of oxygen deficiency.

In particular, in the invention, an example of a preferable perovskite composite oxide having the above composition ratio is lanthanum strontium cobalt ferrate represented by

$$La_{0.6}Sr_{0.4}Co_{0.2}Fe_{0.8}O_3, \qquad (2)$$

but is not limited thereto.

In the air electrode material powder according to the invention, the fine particles having a particle diameter of less than 0.2 μm preferably account for 60% to 80% of the total number of particles on a number basis. At the same time, the Sr/La atomic ratio in the surface layer of 40% to 70% of the total number of the fine particles on a number basis is three or more times larger, preferably three to six times larger than the Sr/La atomic ratio in the surface layer of the coarse particles to which the fine particles adhere.

When such an air electrode material powder is fired on the electrolyte layer, a densified air electrode is formed without impairment of porous structure or generation of non-uniformity.

Further, the air electrode material powder according to the invention preferably has an average particle diameter in the range of 1 to 10 μm so that, the resulting air electrode is superior in conductivity. The average particle diameter is measured using a laser diffraction/scattering particle size distribution measuring device.

When the average particle diameter of the air electrode material powder is less than 1 μm, the obtained air electrode may be more densified, and may result, in interference with the transport of oxygen to the electrolyte interface. When the average particle diameter of the air electrode material powder is more then 10 μm, the number of contacts among the particles in the air electrode may decrease so that the conductivity of the air electrode decreases. These may decrease the performance of the obtained solid oxide fuel cell. At the same time, the number of contacts with a substrate material on which the air electrode is formed, such as an electrolyte substrate or a reaction-preventing layer to be described later, may also decrease so that the adhesion to these substrates may be reduced.

According to the invention, the average particle diameter of the air electrode material powder is preferably in the range of 1.5 to 7 μm, and more preferably in the range of 2 to 5 μm.

In the invention, the fine particle which line a Sr/La atomic ratio in the surface layer three or more times larger than the Sr/La atomic ratio in the surface layer of the coarse particle to which the fine particle adheres may be referred to as strontium-segregated fine particles.

In the invention, the Sr/La atomic ratio in the surface layer of the fine particle and in the surface layer of the coarse particle to which the fine particle adheres are determined by Auger electron spectroscopy.

The Auger electron spectroscopy is an analytical method to obtain information about the kind and amount of elements present in the surface layer of a sample to be analyzed by irradiating the sample with accelerated electrons usually to detect the Auger electrons having the energy peculiar to the element emitted from the surface layer of 10 nm or less of the sample. Therefore, in the invention, the surface layer of coarse particle and the surface layer of fine particle refer to a layer having a maximum depth of 10 nm from the surface.

In order to obtain the Sr/La atomic ratio in the surface layer of the fine particle by the Auger electron spectroscopy, first, an electron micrograph (SEM image) of an air electrode material powder containing coarse particles and fine particles is taken, and then the number of the coarse particles and the number of the fine particles adhering to the surface of the coarse particles are counted in the SEM image, thereby calculating the number ratio of the number of the fine particles to the total number of particles.

Then, in the same field of view as the SEM image, a mapping image of strontium and lanthanum in the surface layer of each of the coarse particles and in the surface layer of each of the fine particles adhering to the coarse particle is obtained by the Auger electron spectroscopy, thereby it is confirmed that strontium is segregated mainly in the surface layer of the fine particles as compared with the coarse particles. In the surface layer of the fine particles in which strontium is segregated, the lanthanum is displayed dark in the mapping image of lanthanum, and the strontium is displayed bright in the mapping image of strontium.

Thus, in the analysis of the mapping image, the atomic number concentration of strontium and lanthanum are measured by the Auger electron spectroscopy in the surface layer of each of the coarse particles and the fine particles to obtain the Sr/La atomic ratio in the surface layer of each of the coarse particles and the fine particles, and then the magnification of the Sr/La atomic ratio in the surface layer of each of the fine particles to the Sr/La atomic ratio in the surface layer of each of the coarse particles can be obtained.

Accordingly, by counting the number of the fine particles having a Sr/La atomic ratio in the surface layer three or more times larger than the Sr/La atomic ratio in the surface layer of the coarse particles, the ratio of the number of the fine particles having an Sr/La atomic ratio three or more times larger than the Sr/La atomic ratio in the surface layer of the total number of fine particles can be determined on a number basis.

According to the air electrode material powder of the invention, as described above, the Sr/La atomic ratio in the surface layer of 40% or more of the total number of fine particles having a particle diameter of less than 0.2 μm on a number basis is three or more times larger than the Sr/La atomic ratio in the surface layer of the coarse particles to which the fine particles adhere. According to the invention, when the air electrode material powder is made into a paste, and the paste is applied to the surface of the electrolyte substrate to form a green layer, and then the green layer is sintered to form an air electrode, then cracks are hardly generated in the air electrode thus formed.

On the other hand, when the Sr/La atomic ratio in the surface layer of 70% or more of the total number of the fine particles having a particle diameter of less than 0.2 μm on a number basis is three or more times larger than the Sr/La atomic ratio in the surface layer of the coarse particles to which the fine particles adhere, the air electrode prepared by sintering such an air electrode material powder as mentioned above decreases in conductivity, and fails to function sufficiently as an air electrode of solid oxide fuel cells. Therefore, it is preferred that the fine particles having a particle diameter of less than 0.2 μm and having the Sr/La atomic ratio in the surface layer three or more times larger than the Sr/La atomic ratio in the surface layer of the coarse particles to which the fine particles adhere account for 70% or less of the total number of fine particles.

Even when the fine particles have the Sr/La atomic ratio in the surface layer three or more times larger than the Sr/La atomic ratio in the surface layer of the coarse particles to which the fine particles adhere, and when the fine particles have the Sr/La atomic ratio in the surface layer more than six times larger than the Sr/La atomic ratio in the surface layer of the coarse particles, the air electrode obtained by sintering such an air electrode material powder contains such fine particles and has a reduced conductivity, and fails to have a sufficient function as an air electrode of solid oxide fuel cells. Therefore, the Sr/La atomic ratio in the surface layer of the fine particles is preferably six or less times larger than the Sr/La atomic ratio in the surface layer of the coarse particles.

The method for producing the air electrode material powder according to the invention is, for example, as follows, but not limited thereto.

A compound each containing lanthanum, strontium, cobalt and iron, respectively, is mixed together in a predetermined composition ratio to obtain a raw material mixture, and then the raw material mixture is fired to obtain a fired product. Then, while a wet grinding solvent is heated at a temperature in the range of 40° C. to 60° C., the fired product is wet ground in the wet grinding solvent in the presence of grinding media and then dried without performing filtration or the like wherein in the wet grinding the type and diameter of the grinding media, the ratio of the grinding media to the fired product, the temperature of the wet grinding solvent, etc. are appropriately adjusted, to provide an air electrode material powder composed of perovskite composite oxide particles which have an average particle diameter usually in the range of 1 to 10 μm, wherein the fine particles having a diameter of less than 0.2 μm account for 60% or more, preferably 60% to 80% of total of the particles on a number basis, and wherein 40% or more, preferably 40% to 70% on a number basis of the fine particles has a Sr/Lu atomic ratio in the surface layer of the fine particles three or more times larger, preferably three to six times larger than the Sr/La atomic ratio in the surface layer of the coarse particles.

As a device for wet grinding the fired product, in the presence of grinding media, for example, a ball mill or a vibration mill using zirconia balls as the grinding media is suitably used. The wet grinding solvent, is preferably a protic polar solvent, and water is particularly preferable.

Thus, as described above, the powder obtained by firing the raw material mixture, wet grinding the obtained fired product in the presence of the grinding media, and drying the ground product is composed of the coarse particles and the fine particles adhering to the surface of the coarse particles.

The fine particles having the Sr/La atomic ratio in the surface layer three or more times larger than the Sr/La atomic ratio in the surface layer of the coarse particles are obtained by the above-mentioned method probably because, while the fired product of the raw material mixture is wet ground in the presence of the grinding media, strontium hydroxide is dissolved from the perovskite composite oxide to form an air electrode material into the wet grinding solvent. When water is used as the wet grinding solvent, the solubility of strontium hydroxide increases as the temperature of the water increases, while the solubility of strontium hydroxide decreases when the temperature of the water is lower than 40° C. On the other hand, as deterioration of the grinding media such as zirconia balls is promoted in a wet grinding, it is not preferable to use the grinding solvent at a temperature of 60° C. or higher. For these reasons, the temperature of the wet grinding solvent during wet grinding of the fired product of the raw material mixture is preferably in the range of 40 to 60° C.

According to the invention, it is believed that strontium-segregated fine particles are obtained for the following reasons. That is, the proportion of the surface of the fine particles to the hulk is larger than that of the coarse particles, and the larger the proportion of the surface is, the easier the strontium in the perovskite structure of the fine particles dissolve in the form of strontium hydroxide, and then after the strontium oxide is once dissolved, it dries and precipitates again to provide fine particles having a high Sr/La ratio in the surface layer.

The reason why the fine particles are obtained in such a state that they adhere to the coarse particles is still not clear. However, it is believed that after the strontium in the perovskite structure is dissolved into the grinding solvent as described above, it dries and precipitates again to form strontium hydroxide. It is considered that the strontium hydroxide is interposed between the coarse particles and the fine particles to promote the adhesion between the coarse particles and the fine particles.

However, the air electrode material powder according to the invention is not restricted in any way by the reasons described above.

As described above, the air electrode according to the invention is prepared by, for example, mixing the air electrode material powder with a resin solution to form a paste, applying the paste onto an electrolyte substrate to form a green layer, and then sintering the green layer. The sintering conditions such as the sintering temperature and the sintering time of the green layer are appropriately determined according to the material of the unit cell and the like. The sintering temperature of the green layer is, for example, in the range of 900° C. to 1200° C., and the sintering time is, for example, in the range of about 1 hour to 10 hours.

As described above, the unit cell may have the reaction prevention layer for preventing the reaction between the air electrode and the electrolyte layer. The reaction preventing layer is usually made of a sintered product of ceria powder doped with an oxide of a rare earth element such as gadolinium or samarium.

The reaction-preventing layer is formed, for example, by using a paste of ceria powder doped with the oxide of the rare earth element, applying the paste onto the electrolyte layer to form a green layer, and firing the green layer. In this case, the air electrode is formed by forming a green layer of the air electrode material powder as described above on the reaction preventing layer thus formed and then tiring the green layer on the reaction preventing layer.

The electrolyte layer is required to have a gas barrier property in order to prevent fuel gas and oxygen from leaking. It usually contains 3 to 15 mol % of an oxide of a rare earth element such as yttrium, scandium, or ytterbium. It is composed of a sintered body of doped and stabilized or partially stabilized zirconia. Similarly to the air electrode, the current collector is also formed by sintering the air electrode material powder.

EXAMPLES

The invention will be described below more specifically with reference to examples.

Quantitative analysis of elements, X-ray crystal structure, particle size distribution and average particle diameter, ratio of fine particles to coarse particles on a number basis, and Sr/La atomic ratio in the surface layer of fine particles and of coarse particles to which the fine particles adhere were determined as follow.

Quantitative Analysis of Elements

Quantitative analysis of elements was performed using a high frequency inductively coupled plasma emission spectroscopic analyzer (SPS3100-24HV manufactured by Hitachi High-Tech Science Co., Ltd.).

X-Ray Crystal Structure

The X-ray crystal structure was determined by an X-ray diffractometer (RINT TTR III manufactured by Rigaku Corporation; radiation source CuKo, provided with a monochromator, tube voltage: 50 kV, current: 300 mA, long slit PSA 200 (total length 200 mm, designed angle of aperture: 0.057 degrees) was used and analyzed under the following conditions.

Measurement method: Parallel method (continuous)
Scan speed: 5 degrees/minute
Sampling width: 0.01 degrees
2θ: 20 to 60 degrees Particle Size Distribution and Average Particle Diameter A laser diffraction/scattering particle size distribution measuring device (MT-3300EXII manufactured by Microtrac Bell Co., Ltd.) was used for measurement under the following conditions.
Measurement mode: MT-3300
Measurement upper limit: 1408 μm
Measurement lower limit: 0.021 μm
Refractive index of particle: 2.40
Shape of particle- Non spherical
Refractive index of solvent: 1.333

Number Ratio of Fine Particles to Coarse Particles in Powder

An electron micrograph of sample powder was taken with a scanning electron microscope (JSM-7000F manufactured by JEOL Ltd.), and 200 coarse particles were randomly extracted therefrom. Then, the number of fine particles adhering to the surface of the coarse particles and having a particle diameter of less than 0.2 μm was counted. Thus, the ratio of the fine particles to the coarse particles in the powder on a number basis was calculated.

Analysis of Sr/La Atomic Ratios in Surface Layer of Coarse Particle and in Surface Layer of Fine Particle Adhering to Surface of Coarse Particle The Sr/La atomic ratios in the surface layer of the coarse particle and in the surface layer of the fine particle were measured by an Auger electron spectroscopy (manufactured by ULVAC-Phi Inc., Model 680) under the conditions below.
Primary beam: acceleration voltage: 10 kV, sample current: 10 nA
Detection depth: 10 nm or less
Magnification: 12500 times Production of Air Electrode Material Powder Example 1

73.96 g of lanthanum carbonate ($La_2(CO_3)_3$, manufactured by Wako Pure Chemical Industries, Ltd.), 31.80 g of strontium carbonate ($SrCO_3$, manufactured by Wako Pure Chemical Industries, Ltd.), 8.64 g of cobalt oxide (II, III) ($CO_3O_4$, manufactured by Wako Pure Chemical Industries, Ltd.) and 34.40 g of iron (III) oxide ($Fe_2O_2$, manufactured by Wako Pure Chemical Industries, Ltd.) were weighed in a 500 mL capacity resin pot, into which 150 mL of zirconia beads having a diameter of 1.5 mm and 250 mL of ion-exchanged water were added. The resulting mixture was wet-mixed at 180 rpm for 5 minutes using a planetary ball mill (P-5 manufactured by Fritsch Ltd.), and then the beads were removed. The mixture was heated at 150° C. and dried to remove water to obtain a raw material mixture.

The raw material mixture was put into an alumina crucible. The crucible was placed in an electric furnace (SB-2025 manufactured by Motoyama Co., Ltd.), and was kept at a temperature of 1400° C. for 2 hours to obtain a fired product.

The fired product had an A/B Atomic ratio of 1.00, a La/(La+Sr) atomic ratio of 0.60, a Co/(Co+Fe) atomic ratio of 0.20, and an Sr/La atomic ratio of 0.67.

As a result of analysis using an X-ray diffractometer, the fired product was confirmed to be lanthanum strontium cobalt ferrate having a perovskite structure represented by the composition formula of $La_{0.6}Sr_{0.4}Co_{0.2}Fe_{0.8}O_{3-\delta}$.

200 g of the fired product was weighed into a 500 mL capacity resin pot, to which 165 mL of zirconia beads having a diameter of 3 mm and 100 mL of ion-exchanged water (wet grinding solvent) were added. The fired product was wet ground with a planetary ball mill (P-5 manufactured by Fritsch Ltd.) at 180 rpm for 10 minutes while the grinding solvent was kept at a temperature of 50° C. Then, the beads were removed, and the mixture was heated at 150° C. to remote water, thereby providing a ground product as a powder.

The SEM micrograph of the powder is shown in FIG. 1. An example of one of the fine particles adhering to the surface of one of the coarse particles is shown in a rectangular frame in the micrograph. There is shown one fine particle in the frame. The powder was subjected to mapping analysis by the Auger electron spectroscopy to determine the Sr/La atomic ratio in the surface layer of the coarse particles and of the fine particles adhering to the coarse particles. As a result, the Sr/La atomic ratio in the surface layer of the coarse particles was 0.79 to 0.88, while the Sr/La atomic ratio in the surface layer of the fine particles in which segregation was observed was 2.73 to 4.63. Therefore, the Sr/La atomic ratio in the surface layer in the fine particles in which strontium segregation was observed is 3.1 to 5.9 times larger than the Sr/La atomic ratio in the surface layer of the coarse particles to which the fine particles adhere.

In addition, as a result of analyzing the powder using a laser diffraction/scattering particle size distribution measuring device, the average particle size was 4.4 μm. The number ratio of coarse particles to fine particles in the powder was 29:71. The number ratio of the strontium-segregated particles in the above fine particles was 58%.

Example 2

A raw material mixture was prepared and fired in the same manner as in Example 1 to obtain a fired product. 100 g of the fired product was weighed into a 500 mL capacity resin pot, to which 165 mL of zirconia beads having a diameter of 3 mm and 150 mL of ion-exchanged water were added. The fired product was wet ground at 180 rpm for 20 minutes using a planetary ball mill (P-5 manufactured by Fritseh Ltd.) with the temperature of the grinding solvent being kept at 50° C. After removal of the beads from the fired product, it was heated at 150° C. to remove water to provide a powder as a ground product.

As a result of analyzing the powder using a laser diffraction/scattering particle size distribution analyzer, the average particle size was 2.9 μm.

The number ratio of the coarse particles to the fine particles in the powder was 34:66. The number ratio of strontium-segregated particles in the above fine particles was 42%.

Comparative Example 1

A raw material mixture was prepared and fired to obtain a fired product in the same manner as in Example 1. 1 kg of the fired product was ground at a grinding pressure of 0.6 MPa and a charging rate of 50 g/min using a supersonic jet mill (PJM-200SP manufactured by Nippon Pneumatic Mfg. Co., Ltd.. hereinafter the same) to obtain a powder as a ground product.

As a result of analyzing the powder using a laser diffraction/scattering particle size distribution measuring device, the average particle size was 1.8 μm.

The number ratio of the coarse particles to the fine particles in the powder was 29:71. The number ratio of the strontium-segregated particles in the fine particles was 6%.

Comparative Example 2

A raw material mixture was prepared fired to obtain a fired product in the same manner as in Example 1. 1 kg of the fired product was ground in the same manner as in Comparative Example 1 using a supersonic jet mill to obtain a powder as a ground product.

50 g of the powder is weighed into a 500 mL capacity glass beaker, to which 100 mL of ion-exchanged water was added as a solvent. While keeping the temperature of the solvent at 20° C., the powder was stirred for 60 minutes with a magnetic stirrer, and then heated at 150° C. to remove the water to provide a water-treated powder.

As a result of analyzing the water-treated powder using a laser diffraction/scattering particle size distribution measuring device, the average particle diameter of the powder was 1.8 μm.

The number ratio of the coarse particles to the fine particles in the powder was 23:77. The number ratio of the strontium-segregated particles in the fine particles was 10%.

Confirmation of Strontium Segregation in Surface Layer of Fine Particles in Air Electrode Material Powder The SEM images of the air electrode material powders obtained in the above-described Examples and Comparative Examples were each taken with the Auger electron spectroscopic device to confirm that the fine particles adhered to the surfaces of the coarse particles. In addition, in the same field of view as the SEM image, a mapping image of lanthanum and strontium was obtained, and the defect of lanthanum and the state of segregation of strontium were examined, and the proportion of the strontium segregation in the surface layer of the fine particles adhering to the surface of the coarse particles was measured. The results are shown in Table 1.

Preparation of Paste of Air Electrode Material Powder 2.5 g of each of the air electrode material powders obtained in the above-described Examples and Comparative Examples was weighed into a plastic ointment container (UG ointment container manufactured by Umano Kagaku Youki Kabushiki Gaisya (Yamayu), capacity: 24 mL) together with 2.25 g of ethyl cellulose (tradename: "ethyl cellulose 45 mPa·s", manufactured by Kishida Chemical Co., Ltd., 5% solution in a mixture of toluene/ethanol (80/20 weight ratio) as a solvent having a viscosity of 45 mPa·s at 25° C.), and 0.25 g of terpincol (α-terpineol manufactured by Kanto Kagaku Co., Ltd.). The container was installed in a rotation/revolution mixer (Awatori Rentaro, ARE-250 manufactured by Thinky Corporation) at 2000 rpm for 3 minutes to obt ain a paste of the air electrode material.

Preparation of Electrolyte Substrate 2 g of yttria-stabilized ssireoniim (TZ-8Y manufactured by Tosoh Corporation) was weighed into a round die having a diameter of 20 mm, and molded at a pressure of 100 MPa for 1 minute using a biaxial pressure molding machine to provide a cylindrical molded body.

The molded body was put on a zirconia plate and placed in an electric furnace, followed by firing at a temperature of 1500° C. for 5 hours in an air atmosphere to obtain a sintered body. The sintered body thus obtained was polished using a sample polishing machine (L1000 manufactured by Wingo Co., Ltd.) and a polishing agent (green silicon carbide manufactured by Fujimi Incorporated, #400) to obtain an electrolyte substrate having a thickness of 1 mm.

Production of Sintered Air Electrode

The paste of air electrode material was applied to the electrolyte substrate with a screen mask (SUS, 300 mesh, diameter: 9 mm), After it was allowed to stand at room temperature for 10 minutes, it was placed in a drier and dried at a temperature of 110° C. for 10 minutes to provide a green layer of air electrode material powder.

In this way, the electrolyte substrate on which the green layer of the air electrode material powder was formed was placed on a ziroonia plate and fired in an electric furnace at a temperature of 1200° C. for 2 hours to form a layer of air electrode made of a sintered body of the powder on the surface of the electrolyte substrate.

Evaluation of Adhesion of Air Electrode

A commercially available cellophane adhesive tape was attached to the air electrode laminated on the surface of the electrolyte substrate, and the tape was pulled perpendicularly to the surface of the air electrode to visually examine whether the air electrode was peeled off from the surface of the electrolyte substrate together with the tape. The results are shown in Table 1. The adhesion of the air electrode was defined as "Good" when the air electrode was not peeled off from the surface of the electrolyte substrate together with the tape.

Confirmation of Cracks on Surface of Air Electrode

The air electrode made of a sintered body of the powder was observed with an SEM to examine if tracks were generated on the surface of thereof. The results are shown in Table 1. The case where no crack was generated was defined as "No", and the case where cracks were generated was defined as "Yes".

TABLE 1

|  | Examples | | Comparative Examples | |
| --- | --- | --- | --- | --- |
|  | 1 | 2 | 1 | 2 |
| Average Particle Diameter of Air Electrode Powder Material (μm) | 4.4 | 2.9 | 1.8 | 1.8 |
| Number Ratio of Fine Particles in Air Electrode Powder Material (%) | 71 | 66 | 71 | 77 |
| Number Ratio of Strontium-Segregated Fine Particles (%) | 58 | 42 | 6 | 10 |
| Adhesion | Good | Good | Good | Good |
| Cracks on Surface of Air Electrode | No | No | Yes | Yes |

The air electrode material powder according to the invention comprises the fine particles having a particle size of less than 0.2 μm in an amount of 60% or more of the total particles on a number basis, and 40% or more of the fine particles on a number basis are strontium-segregated. When the air electrode material powder according to the invention is formed into a green layer on an electrolyte substrate and is sintered, it provides an air electrode having no cracks on the surface.

What is claimed is:

1. An air electrode material powder for solid oxide fuel cells, comprising particles of a perovskite composite oxide represented by the formula $ABO_3$, and comprising La and Sr as A-site elements, and Co and Fe as B-site elements,
   wherein the particles comprise coarse particles having a particle diameter of 0.2 μm or more and fine particles having a particle diameter of less than 0.2 μm,
   wherein the fine particles account for 60% or more of the total number of particles on a number basis, and
   wherein the fine particles comprise fine particles X1 each having a Sr/La atomic ratio in a surface layer thereof that is three or more times larger than a Sr/La atomic ratio in a surface layer of the coarse particle to which each of the fine particles X1 adheres, and a number of the fine particles X1 is 40% or more of the total number of the fine particles.

2. The air electrode material powder for solid oxide fuel cells according to claim 1, wherein the fine particles having a particle diameter of less than 0.2 μm account for 60 to 80% of the total number of particles on a number basis.

3. The air electrode material powder for solid oxide fuel cells according to claim 1, wherein the number of the fine particles X1 is in the range of 40% to 70% of the total number of the fine particles.

4. The air electrode material powder for solid oxide fuel cells according to claim 1, wherein the fine particles X1 comprise fine particles X2 each having a Sr/La atomic ratio in a surface layer thereof that is three to six times larger than the Sr/La atomic ratio in the surface layer of the coarse particle to which each of the fine particles X2 adheres, and a number of the fine particles X2 is in a range of 40% to 70% of the total number of the fine particles.

5. An air electrode of solid oxide fuel cells obtained by sintering the air electrode material powder of solid oxide fuel cells according to claim 1.

6. An air electrode of solid oxide fuel cells obtained by sintering the air electrode material powder of solid oxide fuel cells according to claim 2.

7. An air electrode of solid oxide fuel cells obtained by sintering the air electrode material powder of solid oxide fuel cells according to claim 3.

8. An air electrode of solid oxide fuel cells obtained by sintering the air electrode material powder of solid oxide fuel cells according to claim 4.

9. A current collector for solid oxide fuel cells obtained by sintering the air electrode material powder for solid oxide fuel cells according to claim 1.

10. A current collector for solid oxide fuel cells obtained by sintering the air electrode material powder for solid oxide fuel cells according to claim 2.

11. A current collector for solid oxide fuel cells obtained by sintering the air electrode material powder for solid oxide fuel cells according to claim 3.

12. A current collector for solid oxide fuel cells obtained by sintering the air electrode material powder for solid oxide fuel cells according to claim 4.

* * * * *